Aug. 26, 1930.          C. M. VOUGHT          1,774,342
                           AIRCRAFT
                    Filed June 23, 1928      2 Sheets-Sheet 1
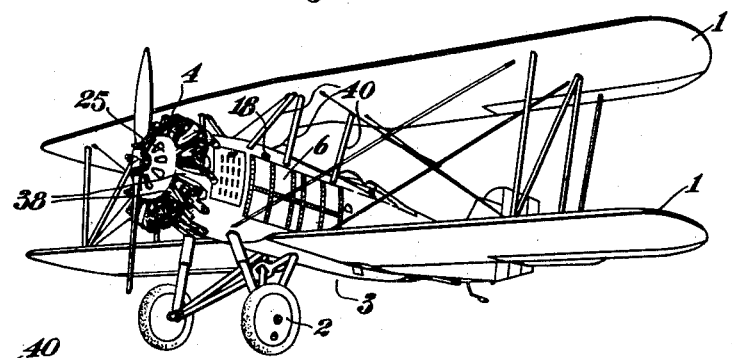
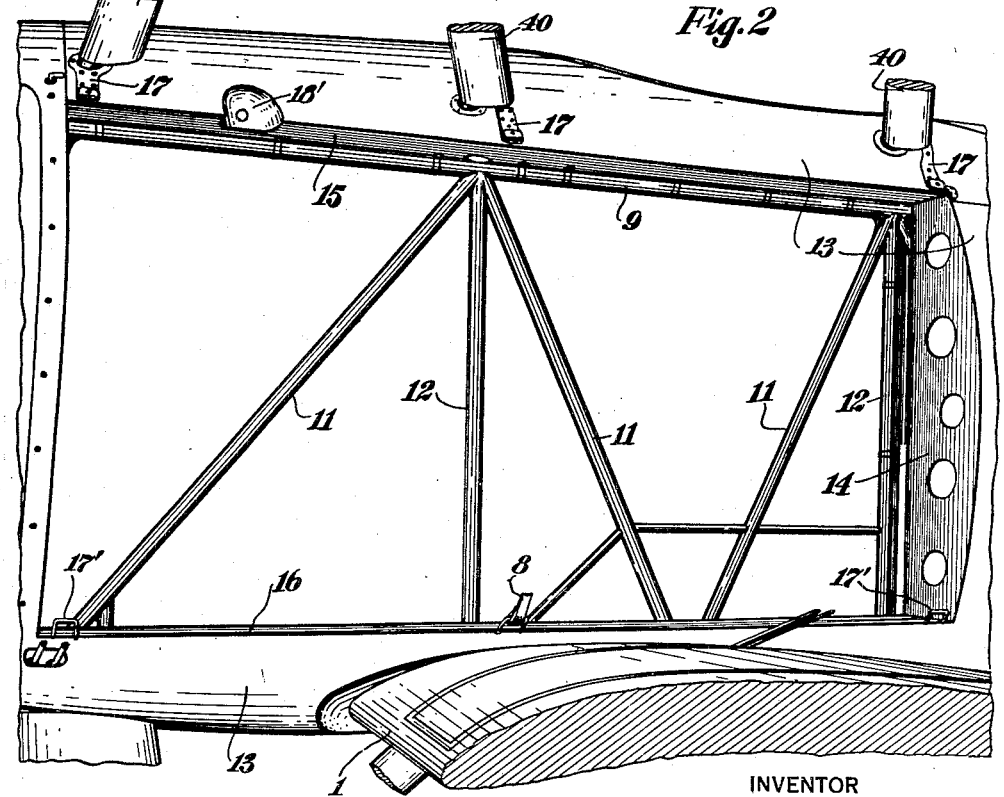
INVENTOR
Chance M. Vought,
BY
Eyre Scott & Keel
ATTORNEYS Aug. 26, 1930.  C. M. VOUGHT  1,774,342
AIRCRAFT
Filed June 23, 1928   2 Sheets-Sheet 2
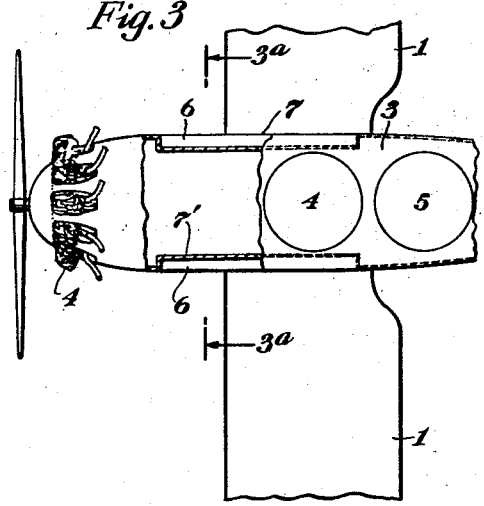
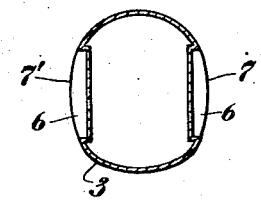
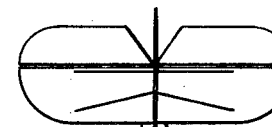
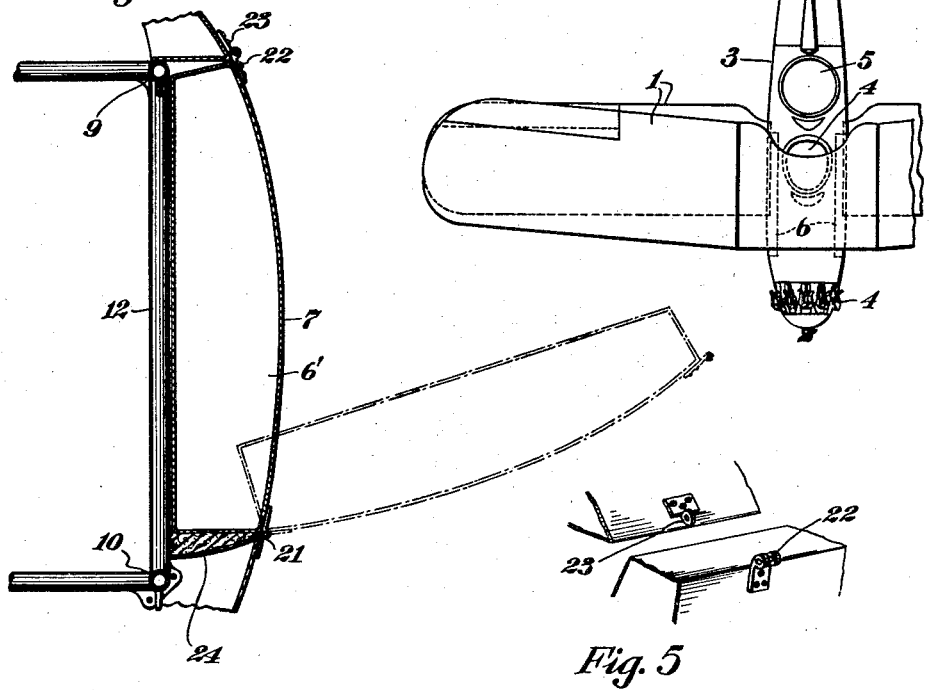
INVENTOR
Chance M. Vought,
BY
Eyre Scott & Keel
ATTORNEYS Patented Aug. 26, 1930

1,774,342

UNITED STATES PATENT OFFICE

CHANCE MILTON VOUGHT, OF GRENWOLDE, GREAT NECK, NEW YORK

AIRCRAFT

Application filed June 23, 1928. Serial No. 287,748.

This invention relates to aircraft and particularly to aeroplanes.

The object of the invention generally is an aeroplane so constructed and arranged as to provide for good maneuverability, excellent balance, good allround performance and a maximum of unobstructed vision. These features are desirable in all types of aircraft and particularly aircraft adapted for naval and military operations. To this end I have devised a special construction and arrangement of fuselage and lifting surfaces resulting in a reduction in length of the fuselage and weight of the craft, with substantial improvement in vision, balance, performance and maneuverability. In carrying out my invention I form the stream-line fairing of the fuselage with large shallow recesses on the sides of the fuselage and in the neighborhood of the center of lift of the craft and form fuel receptacles or tanks into fairing-like members which are positioned within the recesses of the fuselage fairing and fair in with and in effect form a part thereof. By thus forming the stream-line fairing of the fuselage into fuel receptacles in the neighborhood of the center of lift, the cockpits may be moved forward substantially nearer the center of lift than has heretofore been possible, with a corresponding reduction in length of the forward part of the fuselage, and moreover the fuel receptacles can be readily formed into rigid fairing-like members and incorporated into the fuselage as a part of the fairing in a manner to effectively and properly balance and distribute the weight thereof. Preferably also the fairing-like fuel receptacles are readily removable for ready inspection thereof and also to afford ready access to the various accessories contained within the main body and the adjacent cockpit or cockpits. I have shown my invention as embodied in a two-place biplane with the fuselage provided with rectangular shaped recesses or pockets on the sides thereof adjacent the forward cockpit and between the wings, the recesses being elongated in the fore and aft direction to accommodate the fuel receptacles of corresponding shape which are substantially co-extensive in the fore and aft direction with the wings, and in a modified form I have illustrated a special construction and hinged arrangement permitting the easy outward swinging of the fairing-like fuel receptacles for ready inspection.

For a better understanding of the invention, reference may be had to the accompanying drawings forming a part of this application, wherein Fig. 1 is a three-quarter front view of an aeroplane embodying my invention, Fig. 2 is a perspective view of a part of the craft, Fig. 2ª is a top plan view of the machine with parts broken away, Fig. 3 is a diagrammatic plan view of an aeroplane embodying my invention, Fig. 3ª is a sectional view on line 3ª of Fig. 3, Fig. 4 is a sectional view through a modified construction, and Fig. 5 is a perspective view of a detail.

Referring to the drawings I have indicated my invention as embodied in an aeroplane having supporting wings 1, landing gear 2, a fuselage 3, and a power plant 4. It has been the practice heretofore to house and crowd the fuel tanks, together with other accessories within compartments in the fuselage, with the personnel cockpits usually disposed to the rear of such compartments or to have the fuel receptacles disposed within the rearwardly disposed cockpits, with resultant undue length of the fuselage and impaired vision and maneuverability. According to the present invention, I depart from the conventional construction and arrangement, and especially design and construct the fuselage, the cockpits and the fuel receptacles with reference to each other and correlate them with the lifting surfaces in a peculiarly satisfactory manner, and to this end I have formed the fuel receptacles into fairing units fairing in with the curvature of the sides of the fuselage and forming a part thereof, the fairing fuel receptacles being disposed in the vicinity of the center of lift of the craft, with the resultant forward disposition of the cockpit or cockpits to a position adjacent or between the fuel receptacles in the vicinity of the center of lift of the craft. For example, referring to Figs. 3 and 3ª, I have indicated the fuselage 3 of a biplane as being provided with two cockpits 4 and 5 disposed so far forward that the front cockpit 4 is partly disposed under the upper wing and substantially midway of the lower wing, with the fairing-like fuel receptacles 6 disposed on opposite sides of the fuselage and mounted within recesses formed in the sides of the fuselage 3 and having outer curved surfaces 7 forming continuations of the curvatures of the fuselage 3.

Fig. 2 shows a fuselage having a side recess into which a side fairing receptacle 6 is inserted (Fig. 1). The fuselage frame work includes on one side the upper longéron 9 and the lower longéron 10 with intermediate diagonal members 11 and vertical members 12. This frame work is provided with the usual fairing 13 thereabout and the latter is rectangularly recessed between the wings 1 for the reception of the combined fairing and fuel receptacles 6. A rear bulkhead 14 of the fairing 13 is indicated as forming the rearward end of the recess and walls 15 and 16 form respectively the upper and lower sides of a recess. The receptacles 6 rest upon the lower walls 16 of the fairing recesses and are supported flat up against the fuselage frame work. They are detachably fastened in position by the upper and lower fastening devices indicated at 17 and 17', respectively, and the fastening straps 8. Each tank has an opening and cap 18 whereby it may be filled from the outside of the fuselage, a hood 18' being shown for housing the cap. Suitable pipe connections which are omitted from the drawings for convenience are provided within the fuselage structure for the receptacles, and these connections are readily detachable for removing the receptacles. Connections may be provided for connecting either or both of the receptacles to the engine fuel system at will. The receptacle fairings are illustrated as being substantially co-extensive with the upper wing struts 40 (Fig. 2) and extending forward of the lower wing. With the gas tanks thus constructed in the form of side leaves or fairings of the fuselage, they may be readily inserted and removed and inspected, affording ready access to the interior of the fuselage and to the accessories included therein. Moreover the interior of the fuselage being free of the tanks may be utilized for a more forward disposition of the cockpits and for the accommodation of accessories. Moreover, with the tanks thus forming a part of the sides of the fuselage and the interior or cockpits of the fuselage being free of the tanks, the pilot or operator is not hampered in his duties by such tanks. The particular disposition of the receptacle fairings in the fore and aft direction with reference to the wings and the cockpits contributes toward the proper distribution of the weight with reference to the center of lift, while the construction and arrangement as a whole results in a more compact, shorter and lighter structure, with greater vision, improved maneuverability, etc.

In Figs. 1 and 2 the inner surfaces 7' of the fairing fuel receptacles 6 are substantially flat, as indicated in Figs. 3 and 3ª, as are also the outer surfaces 7, but in Figs. 3 and 3ª, the outer surfaces 7 are indicated as being curved to conform exactly to the curvature of the fuselage. The flat outer sides of the receptacles in Figs. 1 and 2 form a substantial continuation of the curvature of the fuselage and this construction of fuel receptacle has advantages from the constructional standpoint.

As indicated in Fig. 3, the upper wing is staggered forward with respect to the lower wing and is swept back so as to have its outer ends substantially not staggered with respect to the lower wing. The upper wing is indicated as cut away at 50 on its rear central edge above the cockpit 4 which together with the sweep back give greater upward vision, while the forward disposition of the pit gives greater forward and downward vision.

In Figs. 4 and 5 I have shown a modification wherein the fairing receptacles 6' are hinged to the outer edge of the lower wall 16 of the recesses by means of the hinged members 21, the upper outer edge of the fairing receptacle having detachable devices 22 in the form of a double eye adapted to straddle cooperating eye connections 23 when the receptacles are swung over into streamline position with the fuselage, suitable connecting pins being passed through the registering openings 22 and 23 for rigidly fastening the tank into position. At 24 I have indicated a suitable felt or other base upon which the receptacles bear in the operative position. In this construction it is only necessary to release the connections 22 and 23 and then swing the fuel receptacles out into the position indicated in dotted lines in Fig. 4 for a ready inspection of both the tanks and the interior of the fuselage.

The particular power plant 4 illustrated includes an air-cooled motor of the stationary cylinder and radial type which is mounted in the front part of the fuselage with its radially disposed cylinders arranged about the longitudinal axis of the fuselage, and the motor frame work carries a member 25 forming the nose cowling structure of the fuselage. The nose cowling unit when secured in position forms a continuation of the stream-line of the fuselage, stream-line strips 38 passing between the motor cylinders and merging into the cowling. It is of light weight, simple construction and durable. The subject matter of this cowling structure is claimed in my application Serial No. 424,182 filed January 29, 1930.

The fuel receptacles 6 preferably have partitions or baffle walls therewithin to impede the shift of the liquid fuel from one end of the tank to the other and in one form these partitions or baffle plates are riveted rigidly to the fuel receptacle walls. In another form these partitions or baffle plates may be formed into a readily insertable unit or crate, the unit being of a size and dimension enabling it to be easily inserted within the top of one end of the tank before the wall of the tank or receptacle is secured in position.

I claim:

1. In an aeroplane a streamlined body having a large shallow recess formed in the streamlined fairing thereof and a fairing-like fuel receptacle conforming in dimensions and shape to said large shallow recess and removably supported therein, said receptacle forming a continuation of the streamlines of the body, the fuel receptacle being hingedly fastened at one side thereof to the body for pivoting movements to positions within said recess and to positions without the same.

2. In an aeroplane a streamlined body having a large shallow recess formed in the streamlined fairing thereof and a fairing-like fuel receptacle conforming in dimensions and shape to said large shallow recess and removably supported therein, said receptacle forming a continuation of the streamlines of the body, the large shallow recess being formed in the side of the streamlined body and is provided with a yielding seat for the fuel receptacle.

3. In an aeroplane the combination of a streamlined fuselage including in the sides thereof and in the vicinity of center of lift fuel receptacles formed as a part of the streamlined fairing, with upper and lower supporting planes, the upper plane being staggered forward relatively to the lower plane but having its ends swept back to a position in substantially non-staggered relation with respect to the ends of the lower plane, and said fuselage having a cockpit disposed between the side fairing receptacles and under the rear edge of the upper wing.

4. In an aeroplane the combination of a streamlined fuselage including in the sides thereof and in the vicinity of center of lift of the craft fuel receptacles formed as a part of the streamlined fairing, with upper and lower supporting planes, the upper plane being staggered forwardly relatively to the lower plane but having its ends swept back to a position in substantially non-staggered relation with respect to the ends of the lower plane, said fuselage having a cockpit disposed under the rear edge of the upper plane and between the side fuel receptacles and the latter being removably carried within recesses formed in the sides of the fuselage.

5. In an aeroplane of the character set forth in claim 3 wherein the lower plane is attached to the fuselage at the lower part thereof and the upper plane is disposed above the fuselage and connected thereto by upwardly extending struts, with the side receptacles disposed in recesses formed in the spaces between the connections of said struts with the fuselage and the connection of the lower wing with the fuselage.

6. In a biplane of the character set forth in claim 3 wherein the fuselage includes an internal frame structure encased by the streamlined fairing with the streamlined fairing interrupted to form side inspection and recess openings therein and the fuel receptacles forming readily removable fairing panels for said openings.

7. In an aeroplane, a streamlined fuselage having an interior skeleton frame structure encased in a streamlined fairing, a cockpit disposed in the vicinity of the center of lift of the craft, said fairing having large side openings formed therein on opposite sides of the cockpit with the lower walls of said openings forming seats for closing panels and said openings affording access to the cockpit and internal frame structure and large shallow fairing-like fuel receptacles conforming in dimensions and shape to and removably supported in said side openings upon the seats and against the frame work to form closing panels, said receptacles forming a continuation of the stream lines of the body.

In testimony whereof, I have signed my name to this specification.

CHANCE M. VOUGHT.